United States Patent
Lu et al.

(10) Patent No.: US 7,404,233 B2
(45) Date of Patent: Jul. 29, 2008

(54) MULTI-STAGE HINGE ASSEMBLY

(75) Inventors: Sheng-Nan Lu, Shulin (TW); Chun-Ching Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 309 days.

(21) Appl. No.: 11/398,686

(22) Filed: Apr. 6, 2006

(65) Prior Publication Data
US 2007/0028419 A1 Feb. 8, 2007

(30) Foreign Application Priority Data
Aug. 4, 2005 (TW) ............................... 94213298 U (51) Int. Cl.
*E05D 5/02* (2006.01)
(52) U.S. Cl. ............................. 16/302; 16/366; 16/287; 248/917
(58) Field of Classification Search .................. 16/282, 16/366, 368, 369, 337, 338, 340; 248/123.11, 248/133, 917, 919, 920, 922; 361/681
See application file for complete search history.

(56) References Cited
U.S. PATENT DOCUMENTS

| | | | | |
|---|---|---|---|---|
| 5,812,368 A | * | 9/1998 | Chen et al. ................. | 361/681 |
| 5,975,472 A | * | 11/1999 | Hung ....................... | 248/278.1 |
| 6,695,274 B1 | * | 2/2004 | Chiu .......................... | 248/371 |
| 6,769,657 B1 | * | 8/2004 | Huang ..................... | 248/278.1 |
| 6,822,857 B2 | * | 11/2004 | Jung et al. .................. | 361/681 |
| 2005/0247832 A1 | * | 11/2005 | Cho et al. ................... | 248/133 |
| 2007/0047186 A1 | * | 3/2007 | Jang .......................... | 361/681 |

* cited by examiner

Primary Examiner—J. Allen Shriver
Assistant Examiner—Matthew J Sullivan
(74) Attorney, Agent, or Firm—Bacon & Thomas, PLLC (57) ABSTRACT

A multi-stage hinge assembly has a first connecting board, a second connecting board, a first hinge, a second hinge, an inner mounting lever and an outer mounting lever. The first connecting board has a first ring, a second ring and a recess. The second connecting board has a first ring and a second ring. The first hinge is mounted on the connecting boards. The second hinge is mounted on the connecting boards. The inner mounting lever is mounted pivotally on the second mounting bracket of the first hinge and the rotating head of the second hinge and has two retaining plates, a holding frame and a spring. The outer mounting lever is mounted pivotally on the second mounting bracket of the first hinge and the rotating head of the second hinge.

11 Claims, 10 Drawing Sheets

MULTI-STAGE HINGE ASSEMBLY

BACKGROUND OF THE INVENTION

1. Field of the Invention

The present invention relates to a multi-stage hinge assembly for a liquid crystal display (LCD), and especially a device for connecting a monitor and a base of an LCD so a user can rotate the monitor relative to the base easily and conveniently.

2. Description of the Related Art

A conventional liquid crystal display comprises a monitor, a conventional multi-stage hinge assembly and a base. The monitor is mounted pivotally on the base by the hinge. To carry and store the liquid crystal display easily, the conventional multi-stage hinge assembly has a first hinge, a second hinge, a connecting shaft and a connecting board. The first hinge has a mounting board attached to the monitor of the liquid crystal display. The second hinge connects to the first hinge and has a mounting board and a spring. The mounting board of the second hinge is attached to the base of the liquid crystal display. The spring connects to the mounting board of the second hinge and has two ends. The connecting shaft is mounted between the first hinge and the second hinge. The connecting board connects to one of the ends of the spring.

However, the weight of the monitor is quite heavy and the force that provided by the spring can not make the monitor raise vertically to return to the original position, and users need to push the monitor returning vertically to the base. In addition, the second hinge is pivoted to allow the monitor to be parallel with the base but the spring forces the monitor to be perpendicular to the base. Therefore, users need to add an additional fastening device to fasten the monitor parallel to the base for resisting the force of the spring.

To overcome the shortcomings, the present invention provides a multi-stage hinge assembly that can turn a monitor relative to a base of a liquid crystal display easily and conveniently to mitigate or obviate the aforementioned problems.

SUMMARY OF THE INVENTION

The objective of the present invention is to provide a multi-stage hinge assembly for a liquid crystal display that can turn a monitor relative to a base of liquid crystal display easily and conveniently.

The multi-stage hinge assembly has a first connecting board, a second connecting board, a first hinge, a second hinge, an inner mounting lever and an outer mounting lever. The first connecting board comprises a first ring, a second ring and a recess. The second connecting board has a first ring and a second ring. The first hinge is mounted on the connecting boards. The second hinge is mounted on the connecting boards. The inner mounting lever is mounted pivotally on the second mounting bracket of the first hinge and the rotating head of the second hinge and has two retaining plates, a holding frame and a spring. The outer mounting lever is mounted pivotally on the second mounting bracket of the first hinge and the rotating head of the second hinge.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 5, a multi-stage hinge assembly in accordance with the present invention comprises a first connecting board (30), a second connecting board (40), a first hinge (10), a second hinge (20), an inner mounting lever (50) and an outer mounting lever (60).

The first connecting board (30) comprises a proximal end, a distal end, a first ring (31), a second ring (32) and a recess (33). The first ring (31) is formed on the proximal end of the first connecting board (30) and has two sides and two mounting holes (311). The mounting holes (311) are formed separately in one of the sides of the first ring (31) and are opposite to each other. The second ring (32) is formed on the distal end of the first connecting board (30) and has an outer side, an inner side, an inserting hole (322), a through hole (323) and an inner step (321). The inserting hole (322) is formed in the outer side of the second ring (32) and has a diameter. The through hole (323) is formed in the inner side of the second ring (32), communicating with the inserting hole (322) and has a diameter. The diameter of the inserting hole (322) is larger than the diameter of the through hole (323). The inner step (321) is formed in the second ring (32). The recess (33) is formed in the first connecting board (30) between the first ring (31) and the second ring (32).

The second connecting board (40) is parallel to the first connecting board (30) and has a proximal end, a distal end, a first ring (41), a second ring (42) and a mounting notch (43). The first ring (41) is formed on the proximal end of the second connecting board (40). The second ring (42) is formed on the distal end of the second connecting board (40) and has a mounting hole and a resilient sleeve (421). The mounting hole is formed through the second ring (42). The resilient sleeve (421) is mounted securely in the mounting hole of the second ring (42). The mounting notch (43) is formed in the second connecting board (40) near the first ring (41).

The first hinge (10) is mounted with the first connecting board (30) and the second connecting board (40) and has a first mounting bracket (11), a spring (12), a second mounting bracket (14), a pivotal shaft (13), a rotating disk (15), a mounting disk (16) and a resilient gasket (17). The first mounting bracket (11) is L-shaped, is mounted on the second connecting board (40) and has a bottom segment (111), a top segment (112), a mounting slot (113) and a spindle (114). The top segment (112) is formed on and extends upward from the bottom segment (111). The mounting slot (113) is formed in the bottom segment (111). The spindle (114) laterally protrudes out of the top segment (112) and extends through the first ring (41) of the second connecting board (40).

The spring (12) is mounted around the spindle (114), abuts the first ring (41) of the second connecting board (40) and has two legs. One of the legs is mounted securely in the mounting notch (43) of the second connecting board (40), and the other leg is mounted in the mounting slot (113) of the first mounting bracket (11).

The second mounting bracket (14) is L-shaped, is mounted on the first connecting board (30) and has a bottom segment (141), a top segment (142), an outer groove (143), an inner groove (144), two through holes (145), a stub (146) and a mounting groove (147). The top segment (142) is formed on and extends upward from the bottom segment (141). The outer groove (143) is formed around the top segment (142). The inner groove (144) is formed around the top segment (142) near the outer groove (143). The through holes (145) are formed separately in the top segment (142). The stub (146) is formed on the top segment (142), is opposite to the through holes (145) and extends into the first ring (31) of the first connecting board (30). The mounting groove (147) of the second mounting bracket (14) is formed axially through the stub (146) and is non-circular.

The pivotal shaft (13) is attached to the second mounting bracket (14) and has a front end, a rear end, a post (131), a nut (132) and a head (133). The post (131) is formed on the front end of the pivotal shaft (13) and extends into the mounting groove (147) of the second mounting bracket (14). The nut (132) is mounted on the rear end of the pivotal shaft (13). The head (133) is formed around the pivotal shaft (13) between the post (131) and the nut (132).

The rotating disk (15) is mounted around the pivotal shaft (13) and has a center, a circular hole (151), two protruding segments (152) and two concave segments (153). The circular hole (151) is formed through the center of the rotating disk (15) and mounted around the post (131) of the pivotal shaft (13). The protruding segments (152) axially protrude out of the rotating disk (15), face each other and are mounted in the mounting hole (311) of the first ring (31) in the first connecting board (30). The concave segments (153) are formed in the rotating disk (15) between the protruding segments (152) and opposite to each other.

The mounting disk (16) is mounted securely on the pivotal shaft (13) between the head (133) and the rotating disk (15) and has a center, a through hole (161) and two protruding segments (162). The through hole (161) is non-circular, is formed through the center of the mounting disk (16) and is mounted securely on the post (131) of the pivotal shaft (13). The protruding segments (162) are formed on the mounting disk (16) and correspond to and selectively engage the concave segments (153) of the rotating disk (15).

The resilient gasket (17) is mounted around the post (131) of the pivotal shaft (13) between the head (133) and the mounting disk (16).

The second hinge (20) is mounted with the first connecting board (30) and the second connecting board (40) and has a first mounting bracket (21), a second mounting bracket (22), a rotating head (29), a pivotal shaft (23), a rotating disk (24), a mounting disk (25), two resilient gaskets (26), a washer (27) and a nut (28). The first mounting bracket (21) is L-shaped, is attached to the second connecting board (40) and has a bottom segment (211), a top segment (212) and a sleeve (213). The top segment (212) is formed on the bottom segment (211). The sleeve (213) laterally protrudes out of the bottom segment (211), extends through the second ring (42) of the second connecting board (40) and is mounted around the resilient sleeve (421).

The second mounting bracket (22) has two sides, a mounting segment (221), a positioning board (222) and an inner washer (224). The mounting segment (221) is formed in one of the sides of the second mounting bracket (22). The positioning board (222) is formed in the other side of the second mounting bracket (22) and has a center, two opposite sides, a through hole (227), two positioning recesses (223) and two mounting recesses (226). The through hole (227) is formed through the center of the positioning board (222). The positioning recesses (223) are formed separately in one of the opposite sides of the positioning board (222). The mounting recesses (226) are formed separately in the other opposite side of the positioning board (222). The inner washer (224) is attached to the positioning board (222) and has two protruding segments (225). The protruding segments (225) protrude out of the inner washer (224) and respectively mounted securely in the positioning recesses (223) of the positioning board (222).

The rotating head (29) is mounted through the inner washer (224) and has an outer groove (291), an inner groove (292), an outer washer (293), a stub (295) and two through holes (297). The outer groove (291) is formed radially in the rotating head (29). The inner groove (292) is formed radially in the rotating head (29) near the outer groove (291). The outer washer (293) is contacted with the inner washer (224) and has a protruding segment (294). The protruding segment (294) protrudes out of the outer washer (293). The stub (295) is hollow, is formed axially on the rotating head (29) near the inner groove (291), extends through the inner washer (224) and the outer washer (293) and has a recess (296). The recess (296) is formed in the stub (295) and is non-circular in cross section. The through holes (297) are formed in the rotating head (29) opposite to the stub (295).

The pivotal shaft (23) extends through the second ring (32) of the first connecting board (30) and has a front end, a rear end, a positioning post (232), a head (231) and a connecting post (233). The positioning post (232) is formed on the front end of the pivotal shaft (23), extends through the inner washer (224) and the outer washer (293) and is mounted securely in the recess (296) of the stub (295). The head (231) is formed around the pivotal shaft (23) near the positioning post (232) and abuts the inner step (321) in the second ring (32) of the first connecting board (30). The connecting post (233) is non-circular in cross section, is formed on the rear end of the pivotal shaft (23), extends through the second ring (32) of the first connecting board (30), the through hole (227) of the second mounting bracket (22) and the resilient sleeve (421) in the second ring (42) of the second connecting board (40), and has a middle, an outer surface and an outer thread (234). The outer thread (234) is formed on the outer surface in the middle of the connecting post (233).

The rotating disk (24) is mounted around the pivotal shaft (23) and has a center, a circular hole (241), two protruding segments (243) and two notches (242). The circular hole (241) is formed through the center of the rotating disk (24) and is mounted around the connecting post (233) of the pivotal shaft (23). The protruding segments (243) protrudes out of the rotating disk (24) and extends into the mounting recesses (226) of the second mounting bracket (22). The notches (242) are formed in the rotating disk (24) between the protruding segments (243).

The mounting disk (25) is mounted securely on the pivotal shaft (23) and has a center, a through hole (251) and two protruding segments (252). The through hole (251) is non-circular in cross section, is formed through the center of the mounting disk (25) and is mounted securely around the connecting post (233). The protruding segments (252) protrudes out of the mounting disk (25) and correspond to and selectively engage the notches (242) of the rotating disk (24).

The resilient gaskets (26) are mounted around the connecting post (233) of the pivotal shaft (23). The washer (27) is mounted around the connecting post (233) and abuts one of the resilient gaskets (26). The nut (28) of the second hinge (20) screws to the outer thread (234) of the connecting post (233).

The inner mounting lever (50) is mounted pivotally on the second mounting bracket (14) of the first hinge (10) and the rotating head (29) of the second hinge (20) and has a lower end, an upper end, two through holes (51), two retaining plates (52), a holding frame (53) and a spring (54). The lower end of the inner mounting lever (50) is inserted into the inner groove (144) in the second mounting bracket (14) of the first hinge (10). The upper end of the inner mounting lever (50) is inserted into the inner groove (292) in the rotating head (29) of the second hinge (20). The through holes (51) are formed respectively through the upper end and the lower end of the inner mounting lever (50). The through hole (51) in the lower end of the inner mounting lever (50) corresponds to one of the through holes (145) of the second mounting bracket (14) in the first hinge (10). The through hole (51) in the upper end of the inner mounting lever (50) corresponds to one of the through holes (297) of the rotating head (29) in the second hinge (20). The retaining plates (52) are respectively formed vertically on the inner mounting lever (50) and correspond to the recess (33) in the first connecting board (30). The holding frame (53) is formed between the retaining plates (52). The spring (54) presses against the holding frame (53) and the recess (33) of the first connecting board (30).

The outer mounting lever (60) is mounted pivotally on the second mounting bracket (14) of the first hinge (10) and the rotating head (29) of the second hinge (20) and has a lower end, an upper end and two through holes (61). The lower end of the outer mounting lever (60) is inserted into the outer groove (143) in the second mounting bracket (14) of the first hinge (10). The upper end of the outer mounting lever (60) is inserted into the outer groove (291) in the rotating head (29) of the second hinge (20). The through holes (61) are formed respectively through the upper end and the lower end of the outer mounting lever (60). The through hole (61) in the lower end of the outer mounting lever (60) corresponds to the other through hole (145) in the second mounting bracket (14) of the first hinge (10). The through hole (61) in the upper end of the outer mounting lever (60) corresponds to the other through hole (297) in the rotating head (29) of the second hinge (20).

Figure 6:
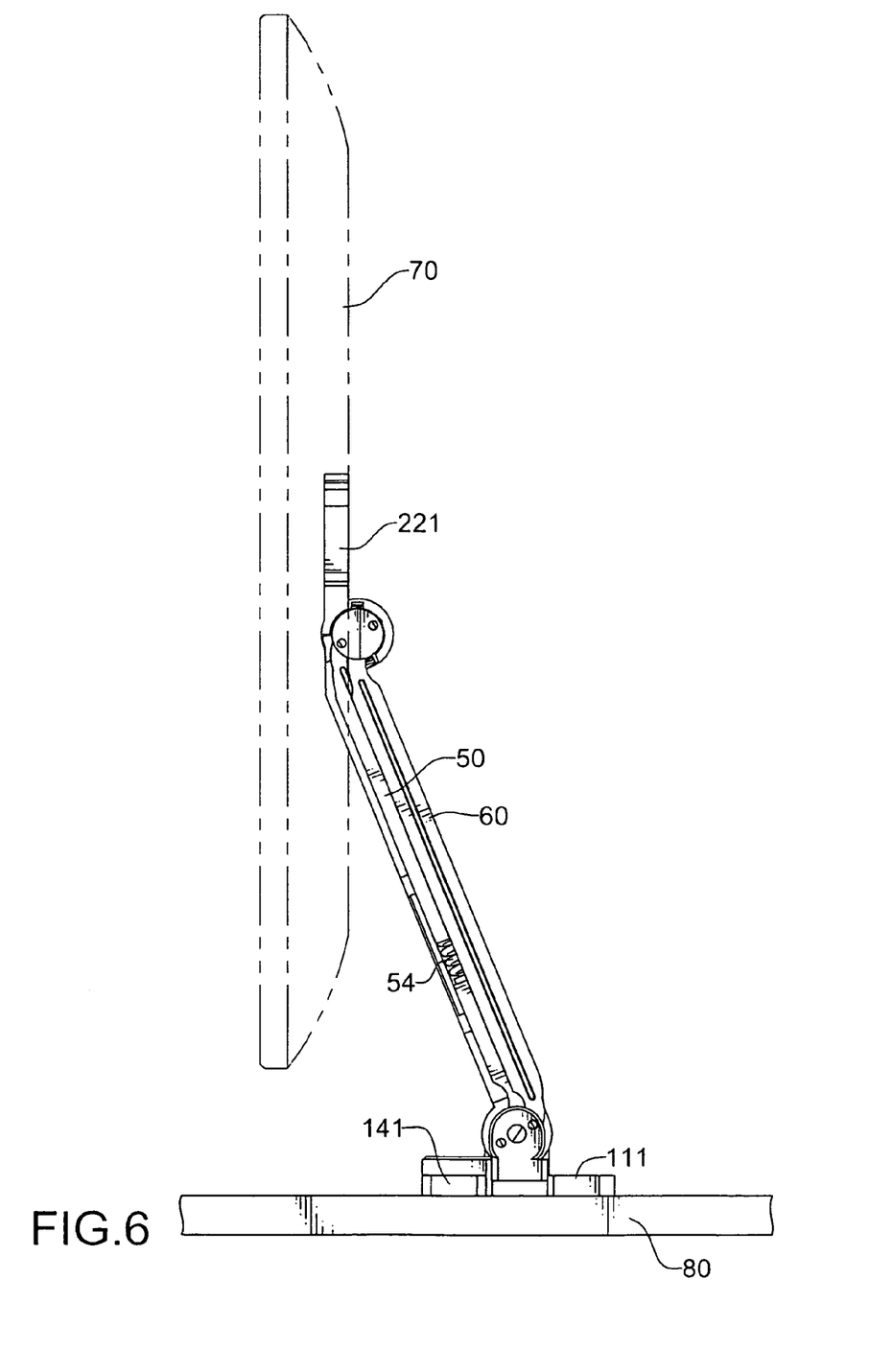
FIG. 6 is a side view of the multi-stage hinge assembly in FIG. 1 with a liquid crystal display (LCD)
Figure 7:
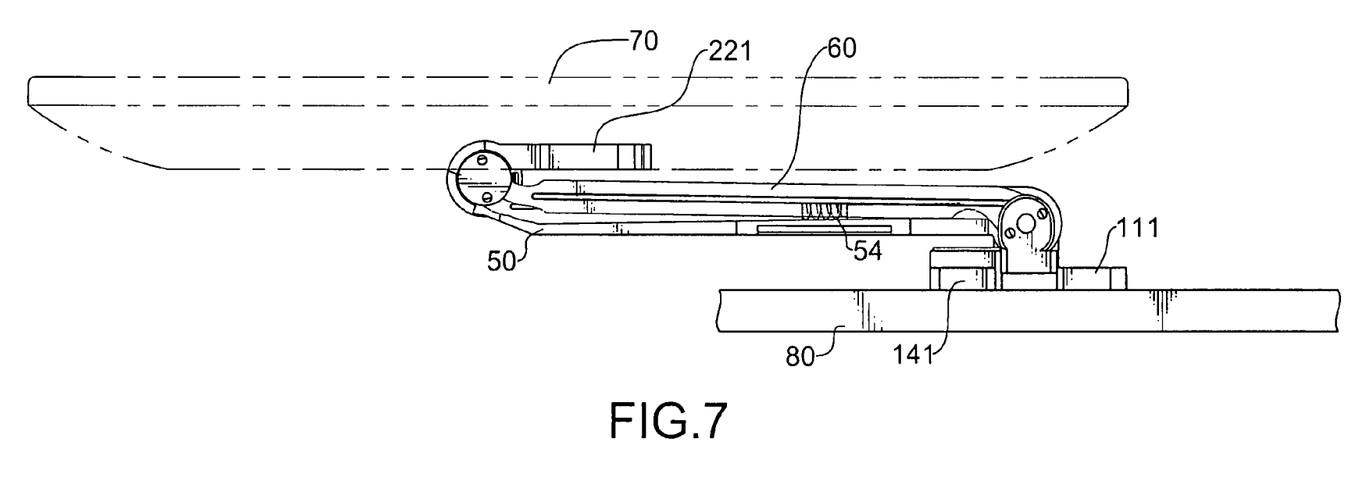
FIG. 7 is an operational side view of the multi-stage hinge assembly in FIG. 6 with the LCD.

With further reference to FIG. 6, a conventional liquid crystal display (LCD) has a monitor (70) and a base (80). The user can attach the multi-stage hinge assembly to the LCD by attaching the top segment (212) of the first mounting bracket (21) and the mounting segment (221) of the second mounting bracket (22) to the monitor (70) and attaching the bottom segment (111) of the first mounting bracket (11) and the bottom segment (141) of the second mounting bracket (14) to the base (80).

Figure 1:
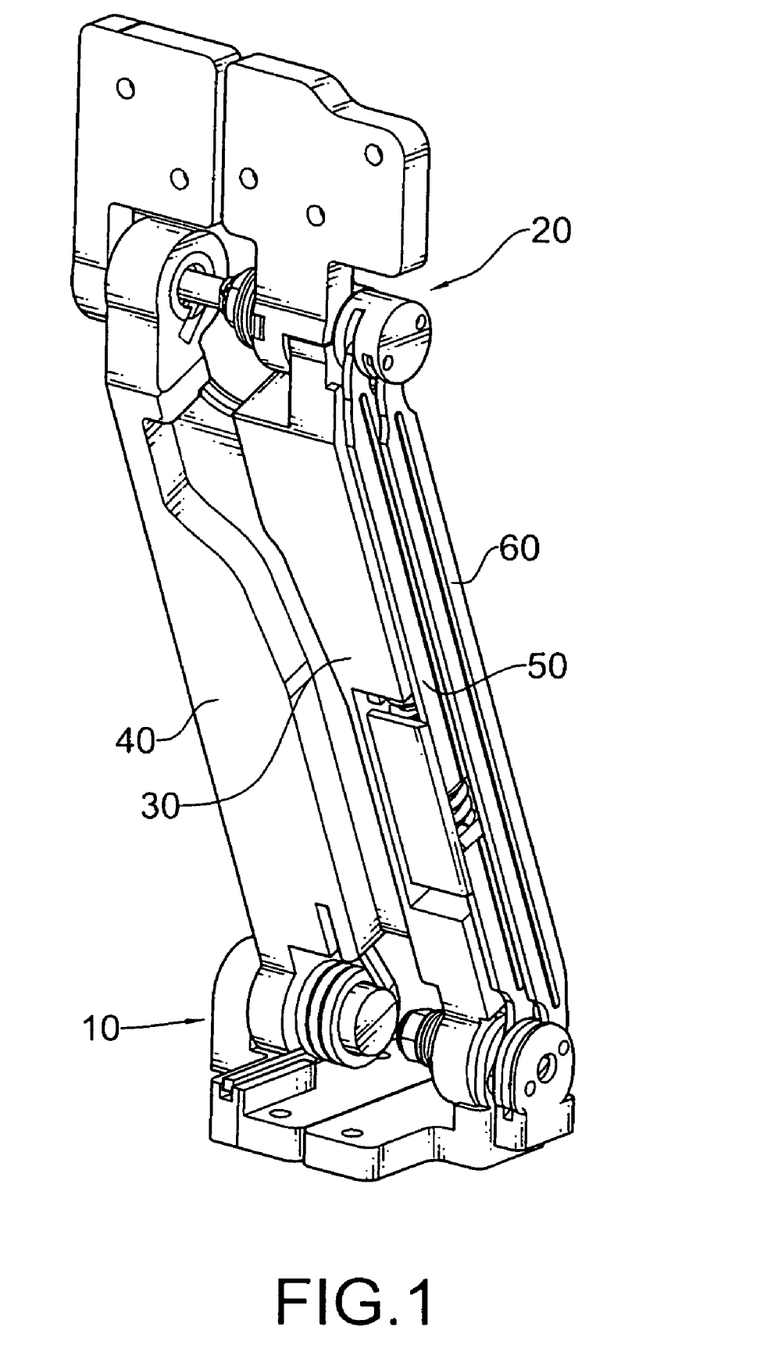
FIG. 1 is a perspective view of a multi-stage hinge assembly in accordance with the present invention.
Figure 2:
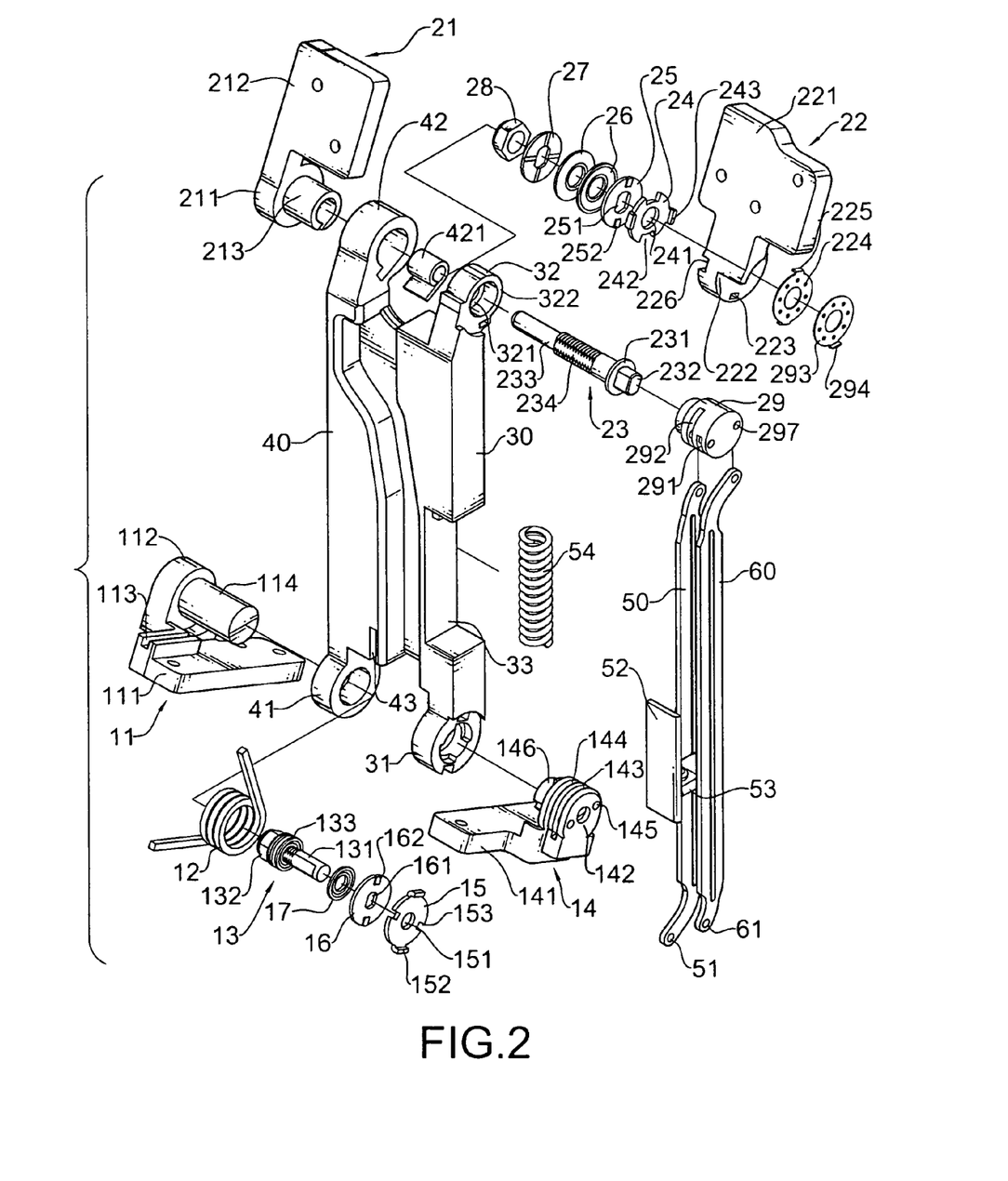
FIG. 2 is an exploded perspective view of the multi-stage hinge assembly in FIG. 1.
Figure 3:
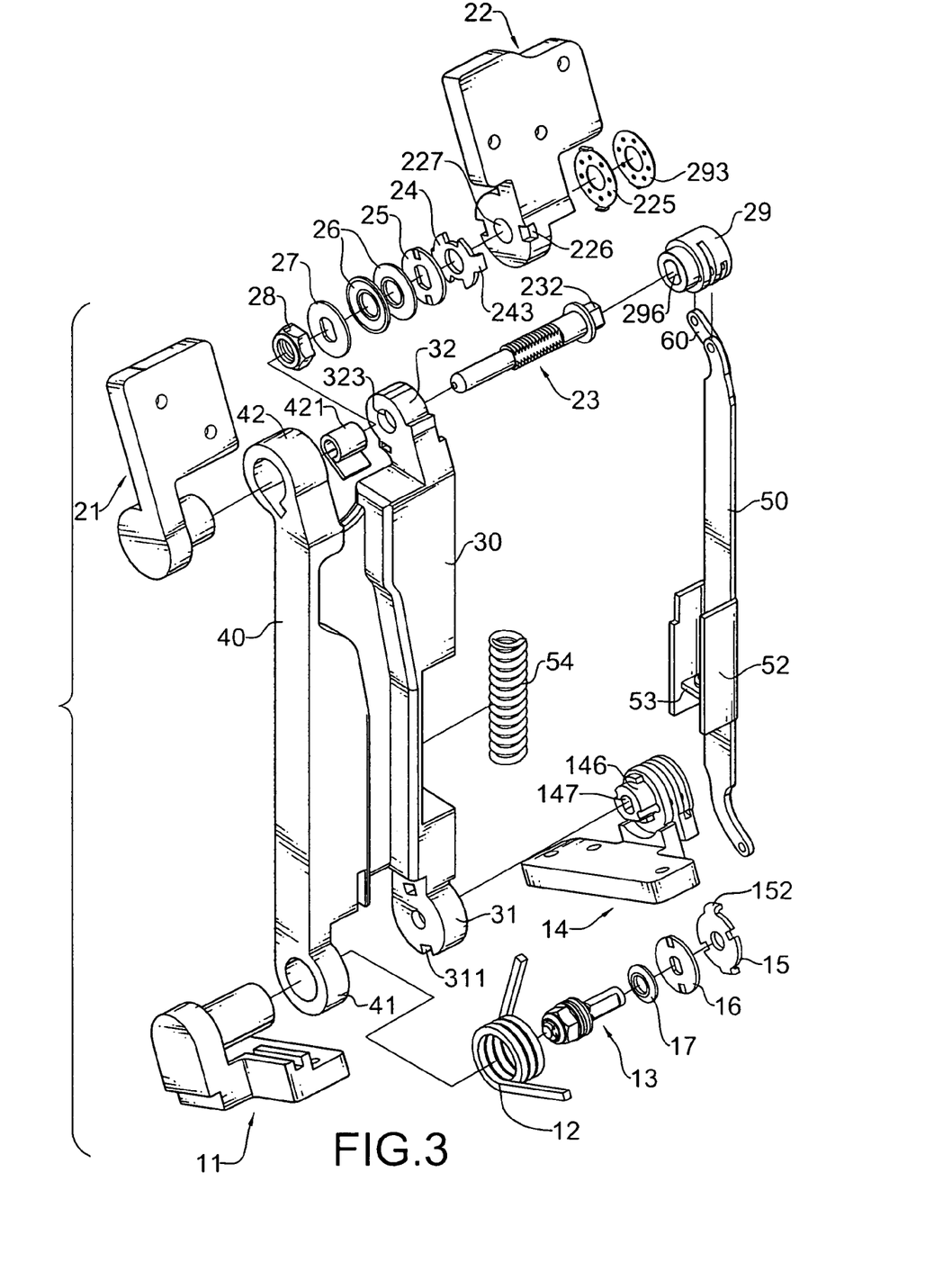
FIG. 3 is an exploded perspective view of the multi-stage hinge assembly in FIG. 1.
Figure 4:
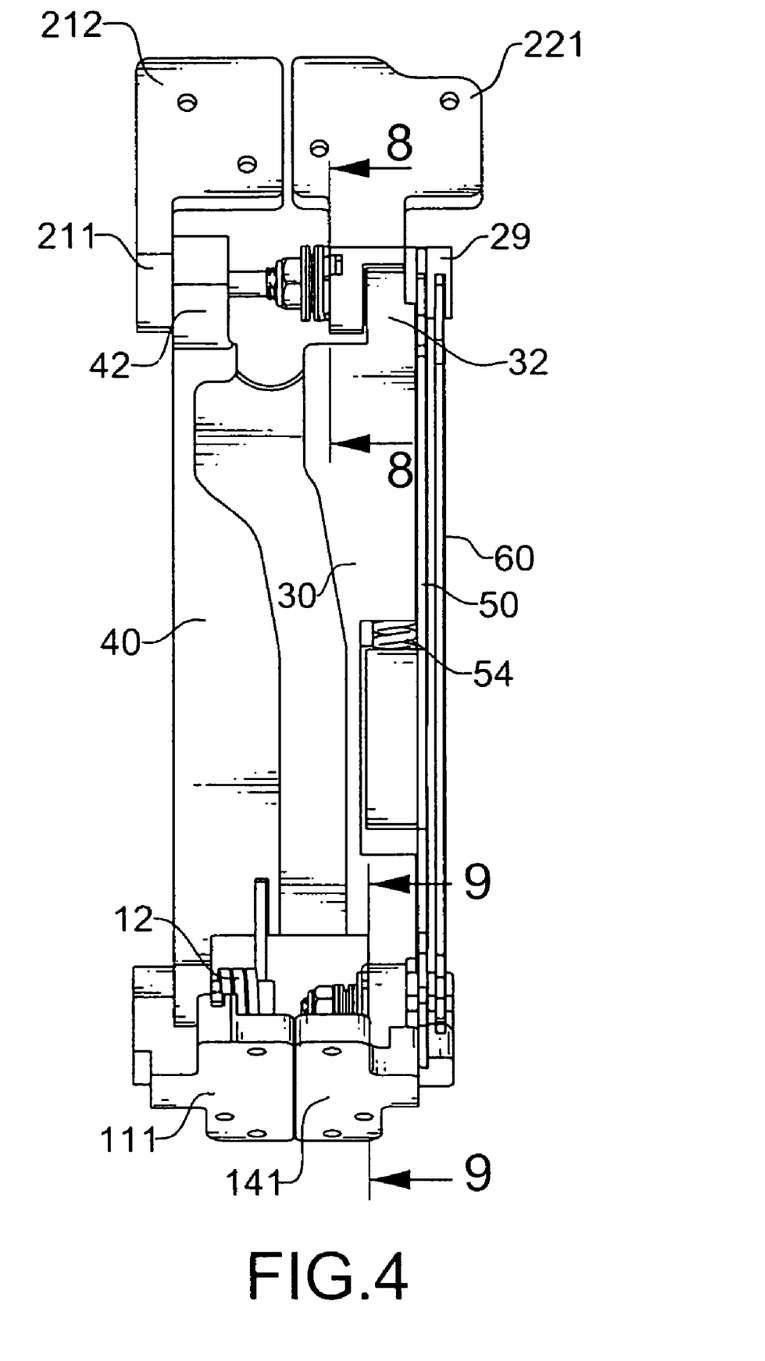
FIG. 4 is a front perspective view of the multi-stage hinge assembly in FIG. 1.
Figure 5:
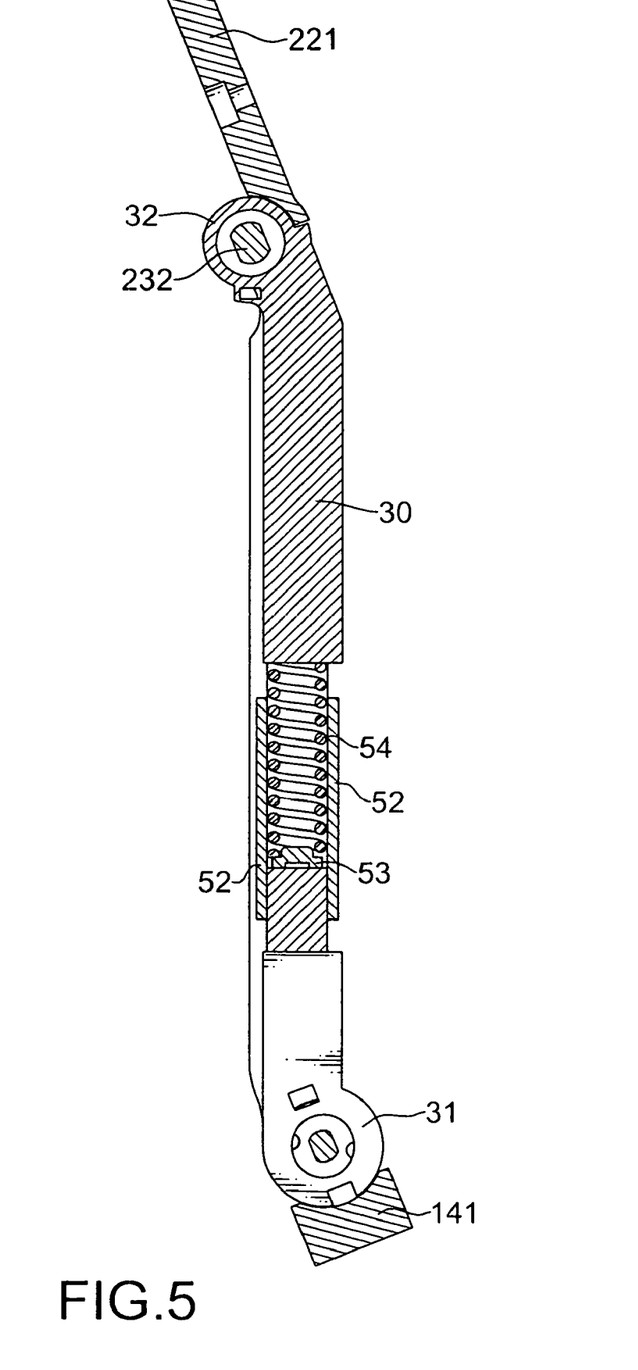
FIG. 5 is a side view in partial section of the multi-stage hinge assembly in FIG. 1.
Figure 8:
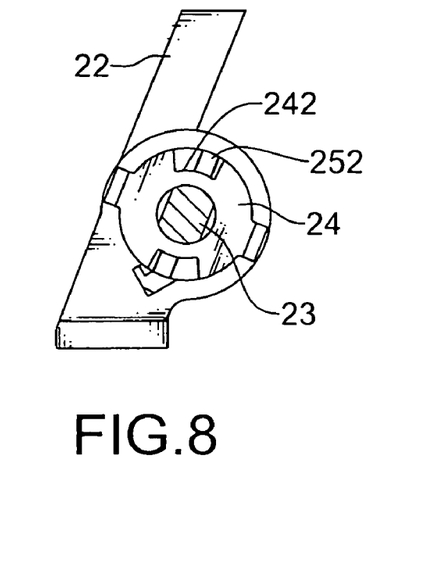
FIG. 8 is a side view in partial section of the element of the multi-stage hinge assembly along line 8-8 in FIG. 4.
Figure 9:
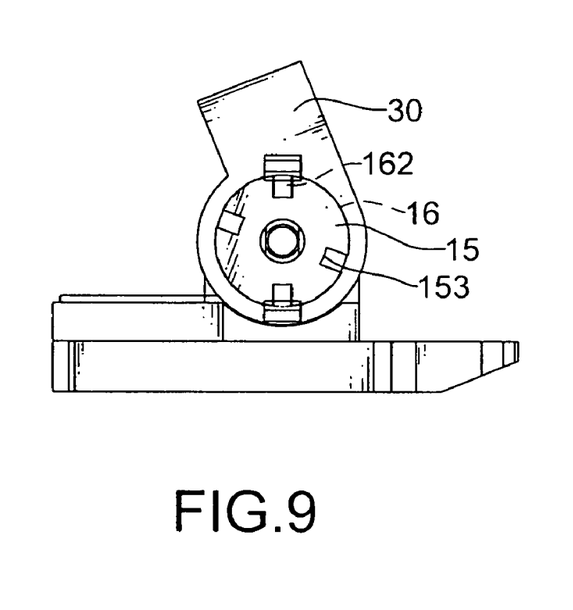
FIG. 9 is a side view in partial section of the element of the multi-stage hinge assembly along line 9-9 in FIG. 4.

With reference to FIGS. 2, 5 and 8, when the user rotate the monitor (70) relative to the base (80), the monitor (70) will make the first mounting bracket (21) and the second mounting bracket (22) rotating. Then, the rotating disk (24) will turn with the second mounting bracket (22) and the notches (242) of the rotating disk (24) may engage the protruding segments (252) of the mounting disk (25) to provide a positioning function for the monitor (70) relative to the base (80).

With reference to FIGS. 2-4, 7 and 9, when the user rotates the monitor (70) to be parallel the base (80), the first connecting board (30) and the second connecting board (40) will rotate along the spindle (114) and the post (131) of the first hinge (10). The spring (12) will make the rotating disk (15) of the first hinge (10) turn. Then, the concave segments (153) of the rotating disk (15) may engage the protruding segments (162) of the mounting disk (16) to provide a positioning function for the first connecting board (30) and the second connecting board (40) against the resilient force of the springs (12,54). Then, the monitor (70) can be positioned parallelly with the base (80).

If the user wants the monitor (70) to return vertically to the base (80), he or she can disengage the concave segments (153) of the rotating disk (15) from the protruding segments (162) of the mounting disk (16). Then, the resilient force of the springs (12,54) can make the first connecting board (30) and the second connecting board (40) rotate along the spindle (114) and the post (131) of the first hinge (10) and automatically return the monitor (70) vertically to the base (80).

Figure 10:
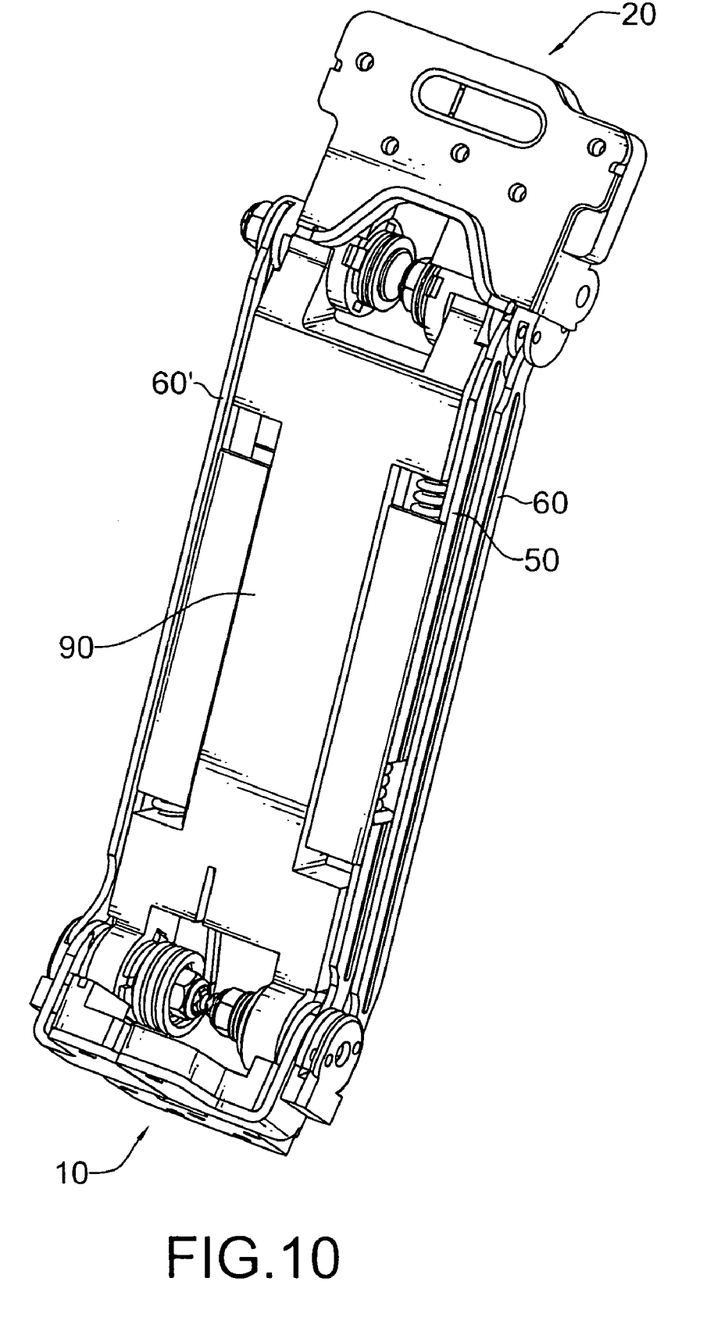
FIG. 10 is a perspective view of another embodiment of a multi-stage hinge assembly in accordance with the present invention.
Figure 11:
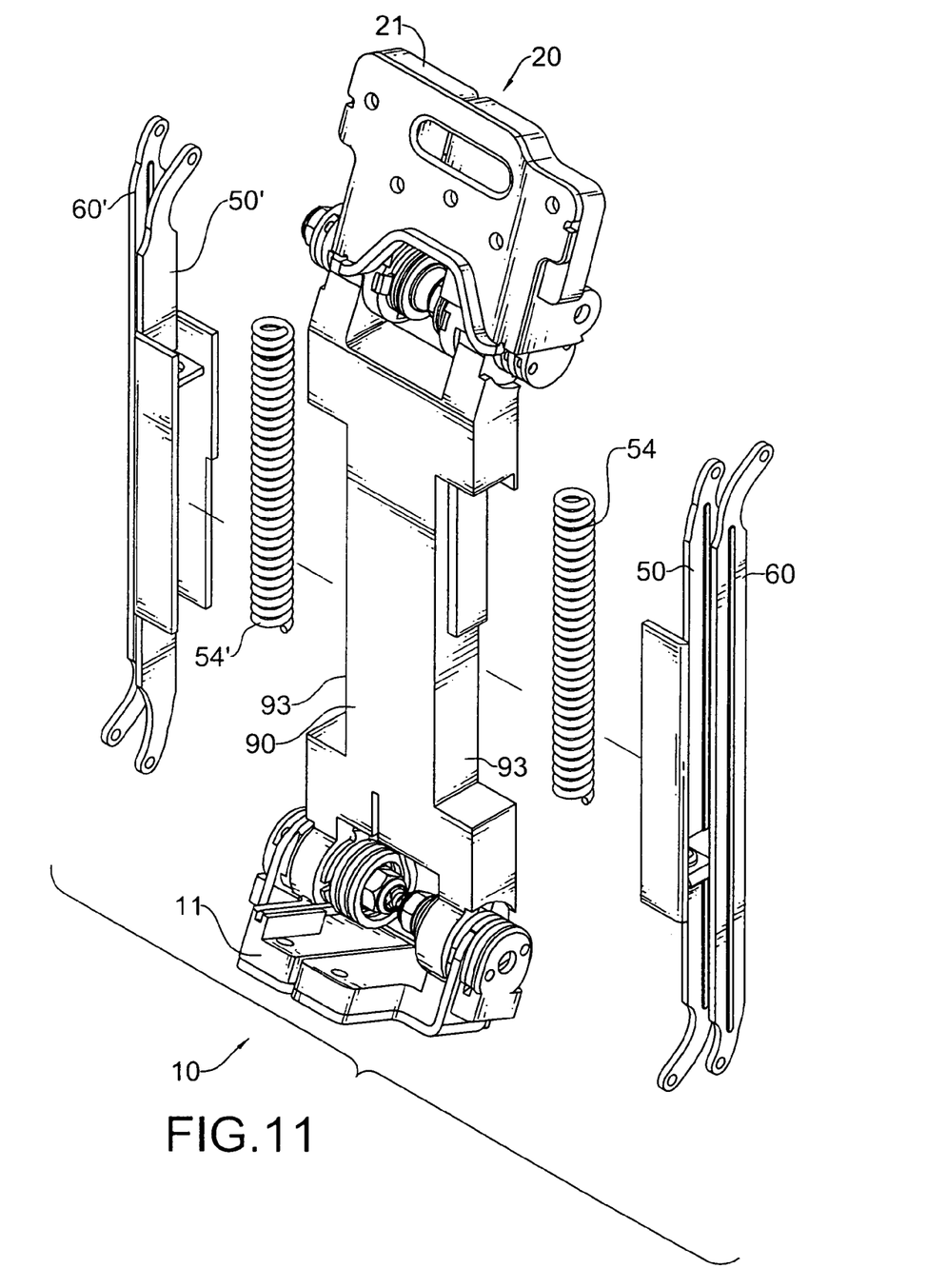
FIG. 11 is an exploded perspective view of another embodiment of the multi-stage hinge assembly in FIG. 10.

With further reference to FIGS. 10 and 11, another embodiment of the multi-stage hinge assembly in accordance with the present invention further comprises an assisting inner mounting lever (50'), an assisting outer mounting lever (60'), a connecting board (90) and a spring (54'). The inner mounting lever (50') and the outer mounting lever (60') are attached respectively to the first mounting brackets (11,21) of the first hinge (10) and the second hinge (20). The connecting board (90) is combined by the first connecting board (30) and the second connecting board (40) and has two recesses (93). The springs (54', 54) are mounted respectively in the recesses (93). Then, the another embodiment of the multi-stage hinge assembly can provide a large force with two springs (54', 54) to hold the monitor (70) that is heavy.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A multi-stage hinge assembly having
a first connecting board (30) having
   a proximal end;
   a distal end;
   a first ring (31) formed on the proximal end of the first connecting board (30);
   a second ring (32) formed on the distal end of the first connecting board (30); and
   a recess (33) formed in the first connecting board (30) between the first ring (31) and the second ring (32);
a second connecting board (40) being parallel to the first connecting board (30) and having
   a proximal end;
   a distal end;
   a first ring (41) formed on the proximal end of the second connecting board (40); and
   a second ring (42) formed on the distal end of the second connecting board (40);
a first hinge (10) mounted with the first connecting board (30) and the second connecting board (40) and having
   a first mounting bracket (11) being L-shaped, attached to the second connecting board (40) and having
     a bottom segment;

a top segment (112) formed on the bottom segment (111); and a spindle (114) protruding out of the top segment (112) and extending through the first ring (41) of the second connecting board (40);

a spring (12) mounted around the spindle (114), abutting the first ring (41) of the second connecting board (40);

a second mounting bracket (14) being L-shaped, mounted on the first connecting board (30) and having a bottom segment;

a top segment (142) formed on the bottom segment (141); and a hollow stub (146) formed on the top segment (142) and extending into the first ring (31) of the first connecting board (30);

a pivotal shaft (13) attached to the second mounting bracket (14) and having a front end;

a rear end; and a nut (132) mounted on the rear end of the pivotal shaft (13);

a rotating disk (15) mounted around the pivotal shaft (13);

a mounting disk (16) mounted securely on the pivotal shaft (13); and a resilient gasket (17) mounted around the pivotal shaft (13) between the nut (132) and the mounting disk (16);

a second hinge (20) mounted with the first connecting board (30) and the second connecting board (40) and having a first mounting bracket (21) being L-shaped, attached to the second connecting board (40) and having a bottom segment;

a top segment (212) formed on the bottom segment (211); and a sleeve (213) protruding out of the bottom segment (211), extending through the second ring (42) of the second connecting board (40) and mounted around the resilient sleeve (421);

a second mounting bracket (22) attached to the first connecting board (30) and having two sides;

a mounting segment (221) formed in one of the sides of the second mounting bracket (22); and a positioning board (222) formed in the other side of the second mounting bracket (22) and having a center; and a through hole (227) formed through the center of the positioning board (222);

a rotating head (29) mounted through the second mounting bracket (22) and having a hollow stub (295) formed axially on the rotating head (29);

a pivotal shaft (23) extending through the second ring (32) of the first connecting board (30);

a rotating disk (24) mounted around the pivotal shaft (23) and having a center;

a circular hole (241) formed through the center of the rotating disk (24) and mounted around the pivotal shaft (23); and two notches (242) formed in the rotating disk (24);

a mounting disk (25) mounted securely on the pivotal shaft (23) and having a center;

a through hole (251) being non-circular in cross section, formed through the center of the mounting disk (25) and mounted securely on the pivotal shaft (23); and two protruding segments (252) protruding out of the mounting disk (25) and corresponding to and selectively engaging the notches (242) of the rotating disk (24);

two resilient gaskets (26) mounted around the pivotal shaft (23);

a washer (27) mounted around the pivotal shaft (23) and abutting to the resilient disk (26); and a nut (28) mounted securely on the pivotal shaft (23);

an inner mounting lever (50) mounted pivotally on the second mounting bracket (14) of the first hinge (10) and the rotating head (29) of the second hinge (20) and having two retaining plates (52) respectively formed vertically on the inner mounting lever (50) and corresponding to the recess (33) in the first connecting board (30);

a holding frame (53) formed between the retaining plates (52); and a spring (54) pressing against the holding frame (53) and the recess (33) of the first connecting board (30);

an outer mounting lever (60) mounted pivotally on the second mounting bracket (14) of the first hinge (10) and the rotating head (29) of the second hinge (20).

2. The multi-stage hinge assembly as claimed in claim 1, further comprising an assisting inner mounting lever (50') attached to the first mounting brackets (11,21) of the first hinge (10) and the second hinge (20);

an assisting outer mounting lever (60') attached to the first mounting brackets (11,21) of the first hinge (10) and the second hinge (20);

the first connecting board (30) and the second connecting board (40) are combined to a connecting board having two recesses (93); and two springs (54') mounted respectively in the recesses (93).

3. The multi-stage hinge assembly as claimed in claim 1, wherein the rotating disk (15) further has a center;

a circular hole (151) formed through the center of the rotating disk (15) and mounted around the pivotal shaft (13); and two concave segments (153) formed in the rotating disk (15) and facing each other;

the mounting disk (16) further has a center;

a through hole (161) being non-circular, formed through the center of the mounting disk (16) and mounted securely on the pivotal shaft (13); and two protruding segments (162) formed on the mounting disk (16) and corresponding to and selectively engaging the concave segments (153) of the rotating disk (15).

4. The multi-stage hinge assembly as claimed in claim 3, wherein the first ring (31) further has two sides; and two mounting holes (311) formed separately in one of the sides of the first ring (31) and being opposite to each other;

the rotating disk (15) further has two protruding segments (152) axially protruding out of the rotating disk (15) and facing each other, mounted in the mounting hole (311) of the first ring (31) in the first connecting board (30);

the second mounting bracket (22) of the second hinge (20) further has
- two opposite sides; and
- two mounting recesses (226) formed separately in the other opposite side of the positioning board (222); and the rotating disk (24) further has two protruding segments (243) protruding out of the rotating disk (24) and extending into the mounting recesses (226) of the second mounting bracket (22).

5. The multi-stage hinge assembly as claimed in claim 4, wherein
the second mounting bracket (14) of the first hinge (10) further has a mounting groove (147) formed axially through the stub (146) and being non-circular;

the pivotal shaft (13) of the first hinge (10) further has
- a post (131) formed on the front end of the pivotal shaft (13) and extending into the mounting groove (147) of the second mounting bracket (14); and
- a head (133) formed around the pivotal shaft (13) between the post (131) and the nut (132).

6. The multi-stage hinge assembly as claimed in claim 5, wherein
the second ring (32) of the first connecting board (30) further has
- an outer side;
- an inner side;
- an inserting hole (322) formed in the outer side of the second ring (32) and having a diameter;
- a through hole (323) formed in the inner side of the second ring (32), communicating with the inserting hole and having a diameter small than the diameter of the inserting hole (322); and
- an inner step (321) formed in the second ring (32);

the stub (295) of the rotating head (29) further has a recess (296) formed in the stub (295) and being non-circular in cross section; and the pivotal shaft (23) of the second hinge (20) further has
- a front end;
- a rear end;
- a positioning post (232) formed on the front end of the pivotal shaft (23) and mounted securely in the recess (296) of the stub (295);
- a head (231) formed around the pivotal shaft (23) near the positioning post (232) and abutting the inner step (321) in the second ring (32) of the first connecting board (30); and
- a connecting post (233) being non-circular in cross section, formed on the rear end of the pivotal shaft (23), extending through the second ring (32) of the first connecting board (30), the through hole (227) of the second mounting bracket (22) and has
  - a middle;
  - an outer surface; and
  - an outer thread (234) formed around the outer surface in the middle of the connecting post (233) and screwed with the screw nut (28).

7. The multi-stage hinge assembly as claimed in claim 6, wherein
the second mounting bracket (14) of the first hinge (10) further has
- an outer groove (143) formed around the top segment (142);
- an inner groove (144) formed around the top segment (142) near the outer groove (143);
- two through holes (145) formed separately in the top segment (142);

the rotating head (29) further has
- an outer groove (291) formed radially in the rotating head (29);
- an inner groove (292) formed radially in the rotating head (29) near the outer groove (291); and
- two through holes (297) formed in the rotating head (29) opposite to the stub (295);

the inner mounting lever (50) further has
- a lower end inserted into the inner groove (144) in the second mounting bracket (14) of the first hinge (10);
- an upper end inserted into the inner groove (292) in the rotating head (29) of the second hinge (20); and
- two through holes (51) formed respectively through the upper end and the lower end of the inner mounting lever (50), the through hole (51) in the lower end of the inner mounting lever (50) corresponding to one of the through holes (145) of the second mounting bracket (14) in the first hinge (10), and the through hole (51) in the upper end of the inner mounting lever (50) corresponding to one of the through holes (297) of the rotating head (29) in the second hinge (20); and the outer mounting lever (60) further has
- a lower end inserted into the outer groove (143) in the second mounting bracket (14) of the first hinge (10);
- an upper end inserted into the outer groove (291) in the rotating head (29) of the second hinge (20); and
- two through holes (61) formed respectively through the upper end and the lower end of the outer mounting lever (60), the through hole (61) in the lower end of the outer mounting lever (60) corresponding to the other through hole (145) in the second mounting bracket (14) of the first hinge (10) and the through hole (61) in the upper end of the outer mounting lever (60) corresponding to the other through hole (297) in the rotating head (29) of the second hinge (20).

8. The multi-stage hinge assembly as claimed in claim 7, wherein
the second ring (42) of the second connecting board (40) further has
- a mounting hole formed through the second ring (42); and
- a resilient sleeve (421) mounted securely in the mounting hole of the second ring (42); and the connecting post (233) of the pivotal shaft (23) in the second hinge (20) extends through the resilient sleeve (421).

9. The multi-stage hinge assembly as claimed in claim 8, wherein
the positioning board (222) of the second mounting bracket (22) of the second hinge (20) further has two positioning recesses (223) formed separately in one of the opposite sides of the positioning board (222);

the second mounting bracket (22) of the second hinge (20) further has
an inner washer (224) attached to the positioning board (222) and has
- two protruding segments (225) protruding out of the inner washer (224) and respectively mounted securely in the positioning recesses (223) of the positioning board (222);

the rotating head (29) of the second hinge (20) further has an outer washer (293) contacted with the inner washer (224) and having
- a protruding segment (294) protruding out of the outer washer (293).

10. The multi-stage hinge assembly as claimed in claim 9, wherein
- the first mounting bracket (11) of the first hinge (10) further has a mounting slot (113) formed in the bottom segment (111);
- the spring (12) of the first hinge (10) further has two legs, one of the legs mounted securely in the mounting notch (43) of the second connecting board (40) and the other leg mounted in the mounting slot (113) of the first mounting bracket (11); and
- the second connecting board (40) further has a mounting notch (43) formed in the second connecting board (40) near the first ring (41).

11. The multi-stage hinge assembly as claimed in claim 1, wherein
- the first ring (31) further has
    - two sides; and
    - two mounting holes (311) formed separately in one of the sides of the first ring (31) and being opposite to each other,
- the rotating disk (15) further has two protruding segments (152) axially protruding out of the rotating disk (15) and facing each other, mounted in the mounting hole (311) of the first ring (31) in the first connecting board (30);
- the second mounting bracket (22) of the second hinge (20) further has
    - two opposite sides; and
    - two mounting recesses (226) formed separately in the other opposite side of the positioning board (222); and
- the rotating disk (24) further has two protruding segments (243) protruding out of the rotating disk (24) and extending into the mounting recesses (226) of the second mounting bracket (22).

\* \* \* \* \*